United States Patent
Zhou

(10) Patent No.: US 9,690,028 B2
(45) Date of Patent: Jun. 27, 2017

(54) BACKLIGHT MODULE, DISPLAY DEVICE AND DISPLAYING METHOD

(71) Applicant: BOE TECHNOLOGY GROUP CO., LTD., Beijing (CN)

(72) Inventor: Chunmiao Zhou, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 13 days.

(21) Appl. No.: 14/770,188

(22) PCT Filed: Nov. 21, 2014

(86) PCT No.: PCT/CN2014/091900
§ 371 (c)(1),
(2) Date: Aug. 25, 2015

(87) PCT Pub. No.: WO2016/015414
PCT Pub. Date: Feb. 4, 2016

(65) Prior Publication Data
US 2016/0259107 A1    Sep. 8, 2016

(30) Foreign Application Priority Data
Jul. 31, 2014   (CN) .......................... 2014 1 0374522

(51) Int. Cl.
*F21V 8/00*       (2006.01)
*G02F 1/1334*    (2006.01)
(Continued)

(52) U.S. Cl.
CPC ......... *G02B 6/0006* (2013.01); *G02F 1/1334* (2013.01); *G02F 1/31* (2013.01);
(Continued)

(58) Field of Classification Search
CPC ......... G02B 6/006; G02F 1/1334; G02F 1/31; G09G 3/34; H04N 13/0418
(Continued)

(56) References Cited

U.S. PATENT DOCUMENTS 4,807,092 A * 2/1989 Hasegawa ................. G09F 9/30
                                                              362/565
5,283,563 A * 2/1994 Allen ................... G02F 1/13476
                                                               349/65
(Continued)

FOREIGN PATENT DOCUMENTS

CN    1632667 A    6/2005
CN    102566110 A   7/2012
(Continued)

OTHER PUBLICATIONS

First Chinese Office Action dated Jun. 5, 2015; Appln. No. 201410374522.8.
(Continued)

*Primary Examiner* — Laura Tso
(74) *Attorney, Agent, or Firm* — Ladas & Parry LLP

(57) ABSTRACT

A backlight module, a display device and a displaying method of the backlight module are disclosed. The backlight module includes a light generation unit and a light emitting control unit. The light generation unit is configured to generate at least two light spot arrays that are spaced from each other, each light spot array includes a plurality of light spots, and projections of the respective light spots on a plane that is vertical to a light emitting direction of the light generation unit are staggered from each other; the light emitting control unit is configured to control the light generation unit to alternatively generate the at least two light spot arrays. The backlight module can be used for 3D displaying, and the depth of field in the displayed image is
(Continued)

increased, and the structure of the backlight module is more compact.

13 Claims, 2 Drawing Sheets

(51) Int. Cl.
  *G02F 1/31* (2006.01)
  *H04N 13/04* (2006.01)
  *G09G 3/00* (2006.01)
  *G09G 3/34* (2006.01)
(52) U.S. Cl.
  CPC ............. *G09G 3/003* (2013.01); *G09G 3/342* (2013.01); *H04N 13/0418* (2013.01)
(58) Field of Classification Search
  USPC ............. 362/558, 554, 561, 97.1, 97.2, 97.3
  See application file for complete search history.

(56) References Cited

U.S. PATENT DOCUMENTS

| | | | | |
|---|---|---|---|---|
| 5,301,090 A * | 4/1994 | Hed | ........................ | F21V 9/10 362/101 |
| 6,655,825 B2 * | 12/2003 | Muthu | ................. | G02B 6/0028 362/555 |
| 7,168,841 B2 * | 1/2007 | Hsieh | ................... | G02B 6/0008 362/558 |
| 8,860,910 B2 * | 10/2014 | Chen | .................... | G02B 6/4298 349/65 |
| 8,985,827 B2 * | 3/2015 | Chen | .................... | G02B 6/0008 362/554 |
| 2006/0152523 A1 | 7/2006 | Tomita | | |
| 2012/0147059 A1 | 6/2012 | Chen et al. | | |
| 2014/0169023 A1 * | 6/2014 | Chen | .................... | G02B 6/0008 362/554 |
| 2014/0204605 A1 * | 7/2014 | Hu | .................... | G02F 1/133606 362/558 |
| 2015/0185390 A1 * | 7/2015 | Hu | ....................... | G02B 6/0008 362/558 |
| 2015/0349031 A1 | 12/2015 | Xu | | |

FOREIGN PATENT DOCUMENTS

| | | |
|---|---|---|
| CN | 103292219 A | 9/2013 |
| CN | 103293686 A | 9/2013 |
| CN | 103700686 A | 4/2014 |
| JP | 4501370 B2 | 7/2010 |

OTHER PUBLICATIONS

International Search Report and Written Opinion both dated May 8, 2015; PCT/CN2014/091900.

* cited by examiner

BACKLIGHT MODULE, DISPLAY DEVICE AND DISPLAYING METHOD

FIELD OF THE INVENTION

Embodiments of the present invention relate to a backlight module, a display device having the same, and a displaying method of the same.

BACKGROUND

Integral imaging stereoscopic display technology is a naked-eye three-dimensional (3D) display technology without using any visual-assist device. The technology has simple processes of recording and displaying, and provides a full-parallax and full color real display without visual fatigue brought by 3D display, so it becomes an interest in 3D display field.

A conventional technology for realizing the integral imaging employs a micro-lens array or small-hole array, and spot array. It is already known a display device with improved depth of field, i.e., multi-layer display. The multi-layer display can display foreground and background respectively by using at least two LCD panels which overlap and space apart from each other, so that a sense of depth is generated. A 3D image is obtained by two pictures with same content and small difference in luminance and size displayed on the front and back panels, respectively.

SUMMARY

A first aspect of the present invention provides a backlight module comprising a light generation unit and a light emitting control unit, wherein the light generation unit is configured to generate at least two light spot arrays spaced from each other, each light spot array comprises a plurality of light spots, the projections of respective light spots onto a plane that is perpendicular to a light emitting direction of the light generation unit are staggered from each other; and the light emitting control unit is configured to control the light generation unit to alternatively generate the at least two light spot array.

A second aspect of the present invention provides a display device comprising the above backlight module.

A third aspect of the present invention provides a displaying method of the above backlight module comprising: controlling a light generation unit by a light emitting control unit to alternatively generate at least two light spot arrays spaced from each other, each light spot array comprising a plurality of light spots, and the projections of respective light spots onto a plane that is perpendicular to a light emitting direction of the light generation unit being staggered from each other.

BRIEF DESCRIPTION OF THE DRAWINGS

In order to clearly illustrate the technical solution of the embodiments of the present invention, the drawings of the embodiments will be briefly described in the following; it is obvious that the described drawings are only related to some embodiments of the invention and thus are not limitative of the present invention.

REFERENCE NUMBERS

100. light generation unit; 101. first light spot array; 102. second light spot array; 110. first light emitting array; 120. second light emitting array; 130. light emitting array; 140. optical fiber; 150. light adjusting unit; 200. light emitting control unit; 300. PDLC (polymer dispersed liquid crystal) optical switch unit; 400. pixel unit; 501, 502. central depth plane

DETAILED DESCRIPTION

In order to make objects, technical details and advantages of the embodiments of the invention apparent, the technical solutions of the embodiments will be described in a clearly and fully understandable way in connection with the drawings related to the embodiments of the invention. Apparently, the described embodiments are just a part but not all of the embodiments of the invention. Based on the described embodiments herein, those skilled in the art can obtain other embodiment(s), without any inventive work, which should be within the scope of the invention.

Embodiments of the present invention provide a backlight module being capable of increasing depth of field in a 3D displayed image. The backlight module comprises a light generation unit and a light emitting control unit. The light generation unit is configured to generate at least two light spot arrays spaced from each other, each light spot array comprises a plurality of light spots, and the projections of respective light spots onto a plane that is perpendicular to a light emitting direction of the light generation unit are staggered from each other.

The light emitting control unit is configured to control the light generation unit to alternatively generate the at least two light spot arrays.

Since the light emitting control unit of the backlight module according to the present embodiment can control the light generation unit to alternatively generate at least two light spot arrays, the light spot arrays are spaced from each other, and the respective light spots of each light spot array are staggered from each other, thus the backlight module of the present embodiment is combined with a pixel unit to display 3D image. The backlight module of the present embodiment has a simple structure so that the thickness of the display device may not be increased.

The backlight module and the display device of the present embodiment are described by taking an example of the light emitting control unit of the backlight module which controls the light generation unit to alternatively generate two light spot arrays. The light emitting control unit of the backlight module in the present embodiment also can control the light generation unit to alternatively generate more than two light spot arrays (e.g., three arrays, four arrays, etc.), which are not described in detail. The structure of the backlight module is described in detail by the following examples.

FIRST EXAMPLE

Figure 1:
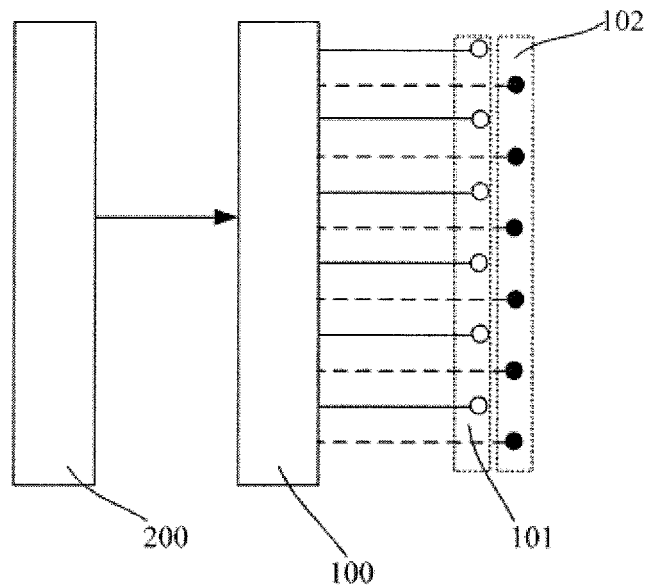
FIG. 1 is a structure schematic diagram of a backlight module according to an embodiment of the present invention.

As illustrated in FIG. 1, the present embodiment provides a backlight module comprising a light generation unit 100 and a light emitting control unit 200. The light generation unit 100 may generate two light spot arrays 101, 102 that are opposite to and spaced from each other. Respective light spots of the first light spot array 101 and respective light spots of the second light spot array 102 are staggered from each other. The light emitting control unit 200 may control the light generation unit 100 to alternatively generate the first and second light spot arrays 101 and 102.

The backlight module may be applied to a display device. When one frame image is displayed, the light emitting control unit 200 may control the light generation unit 100 to generate the first light spot array 101 at a first time so that a part of the image is displayed, and to generate the second light spot array 102 at a second time so that the other part of the image is displayed. Since the respective light spots of the first light spot array 101 and the respective light spots of the second light spot array 102 are staggered from each other, the two part images as displayed are the same frame image viewed from different view angles. The time for displaying one frame image is quite short, so the viewer may see an image combined by the two part images, i.e., a 3D image. The first and second light spot arrays 101 and 102 generated by the light generation unit 100 of the present example are spaced from each other in a distance, so the two part images are located at two central depth planes 501 and 502 (see FIG. 4), respectively, so as to increase the depth of field in the image.

Figure 2:
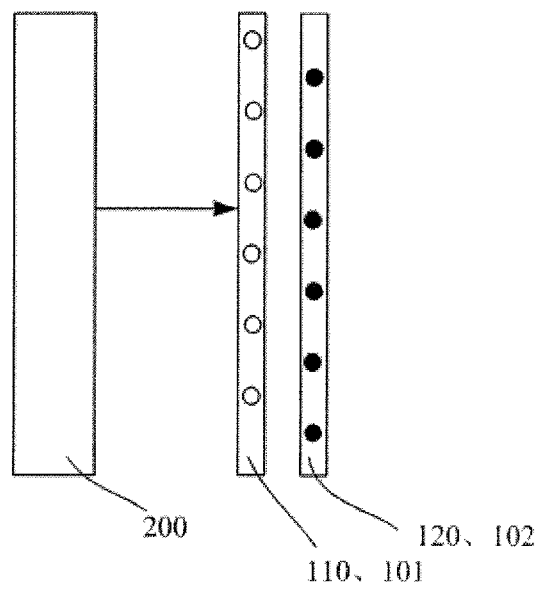
FIG. 2 is an another structure schematic diagram of the backlight module according to an embodiment of the present invention.

As illustrated in FIG. 2, for example, the light generation unit 100 comprises a first light emitting array 110 and a second light emitting array 120 spaced from each other, each of the first and second light emitting arrays comprises a plurality of light emitting elements, and the respective light emitting elements of the first light emitting array 110 and the respective light emitting elements of the second light emitting array 120 are staggered from each other. The light emitting control unit 200 controls the first and second light emitting arrays 110 and 120 to generate the first and second light spot arrays 101 and 102, respectively.

Since the first and second light emitting arrays 110 and 120 generate the first and second light spot arrays 101 and 102 respectively under the controlling of the light emitting control unit 200, i.e., the first and second light emitting arrays 110 and 120 are turned on alternatively, and there is a distance between the first and second light emitting arrays 110 and 120, the light emitting elements of the first light emitting array 110 and the light emitting elements of the second light emitting array 120 are staggered from each other, the backlight module may generate two central depth planes at different depth in space, so that a 3D image is displayed and the depth of field in the image is further increased. The light emitting elements of the first and second light emitting arrays 110 and 120 may be organic light emitting diode, laser diode, or other light emitting elements. In the present example, since the light emitting elements of the first and second light emitting arrays 110 and 120 may be organic light emitting diode or laser diode, the positions of the light emitting elements as illustrated in FIG. 2 are also the positions of the formed light spots.

SECOND EXAMPLE

Figure 3:
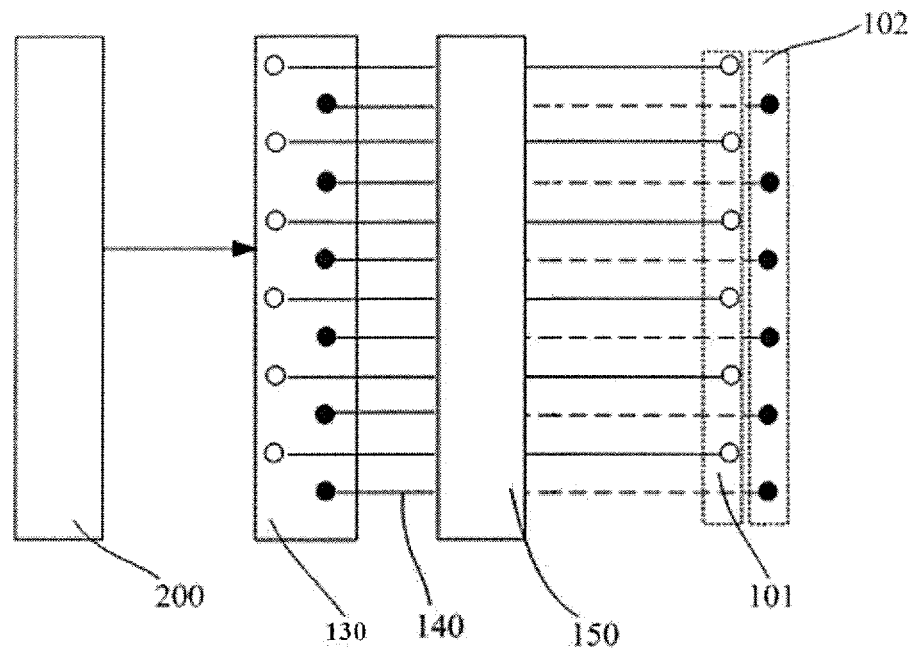
FIG. 3 is a still another structure schematic diagram of the backlight module according to an embodiment of the present invention.

As illustrated in FIG. 3, the present example differs from the first example in that: the light generation unit 100 comprises a plurality of light emitting elements arranged in a light emitting array 130. In addition, the backlight module of the present example further comprises a plurality of optical fibers 140 configured to transmit light emitted from the light emitting elements, and a light adjusting unit 150 configured to control the optical fibers 140 to be turn on/off, so that the first and second light spot arrays 101 and 102 are generated in turn.

The light emitting control unit 200 turns on the light emitting elements. The light emitted from the light emitting elements is transmitted by the optical fiber 140 to reach the positions corresponding to the first or second light spot array 101 or 102. Each fiber 140 is provided with the light adjusting unit 150 to control the optical fibers 140 to be turn on/off, so that the first light spot array 101 is formed at a first time by the light generated by the light generation unit 100, and the second light spot array 102 is formed at a second time. As a result, the backlight module can generate two central depth planes at different depth in space, so that a 3D image is displayed and the depth of field in the image is further increased.

It would be understood that the light emitting control unit 200 may control the light generation unit 100 to generate only the first light spot array 101 or only the second light spot array 102, or simultaneously generate both of the first and second light spot arrays 101 and 102, and thus the backlight module can serve as a backlight source for displaying 2D image. The image formed by both of the first and second light spot arrays 101 and 102 has a higher luminance than the image formed by only the first or second light spot array 101 and 102.

Figure 4:
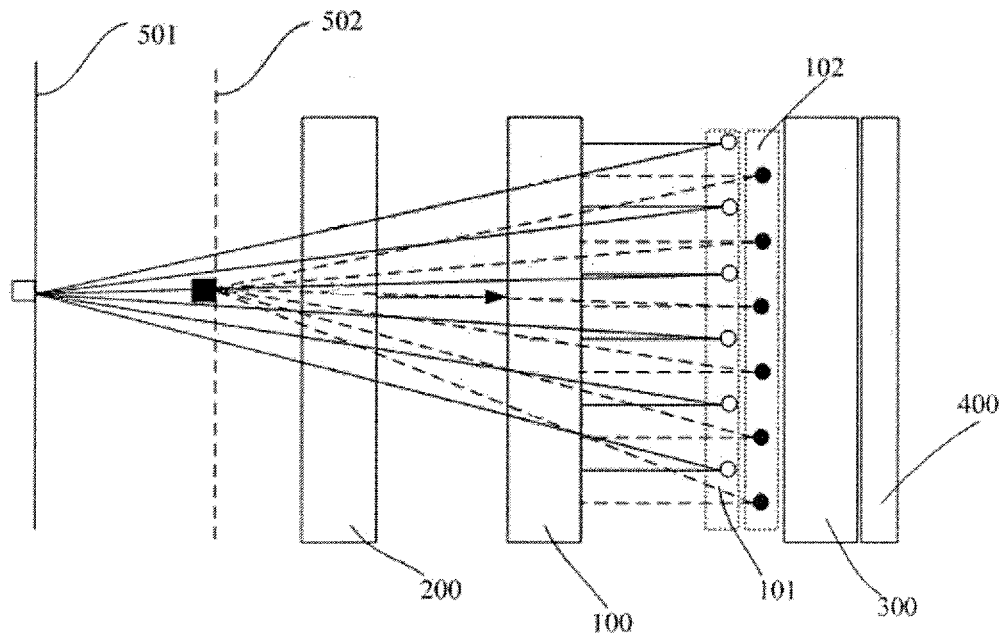
FIG. 4 is a structure schematic diagram of a display device according to an embodiment of the present invention.

As illustrated in FIG. 4, another embodiment of the present invention provides a display device comprising the backlight module as above described. The display device may be any product or device that can perform displaying, such as mobile phone, tablet computer, TV, display, laptop computer, digital picture frame, navigator, etc.

Since the display device of the present embodiment comprises the backlight module as above described, it can display a 3D image as well as a 2D image, and the depth of field in the 3D image is enhanced significantly. The display device also has a compact structure and a simple manufacture process.

In an example, the display device further comprises a pixel unit 400 disposed at a light exiting side of the backlight module. Each light spot corresponds to one sub-pixel included in the pixel unit 400.

In an example, the display device further comprises a polymer dispersed liquid crystal (PDLC) optical switch unit 300 interposed between the backlight module and the pixel unit 400. When displaying a 3D image, the PDLC optical switch unit 300 is turn on and in transparent state, so the light of the backlight module may pass through the PDLC optical switch unit 300 to display the image. When displaying a 2D image, the PDLC optical switch unit 300 is turn off to diffuse the light emitted from the backlight module, and thus the effect of the displaying is better. It would be understood that the PDLC optical switch unit 300 also can be turn on when displaying a 2D image, which may not affect the light emitted from the backlight module.

The display device may further comprise other conventional structures, such as, display driving unit, etc.

Still another of the present invention embodiment provides a displaying method of the backlight module described as above. Referring to FIG.1, the method comprises: controlling the light generation unit 100 by the light emitting control unit 200 to alternatively generate two light spot arrays 101 and 102 that are spaced from each other, each of the light spot arrays comprising a plurality of light spots, and the projections of respective light spots onto a plane that is perpendicular to a light emitting direction of the light generation unit 100 being staggered from each other.

As illustrated in FIG. 2, in an example, controlling the light generation unit 100 by the light emitting control unit 200 to alternatively generate two light spot arrays 101 and 102 that are spaced from each other comprising:

controlling a part of light emitting elements in the light generation unit 100 by the light emitting control unit 200 to form a first light spot array 101, and controlling the other of the light emitting elements by the light emitting unit 200 to form a second light spot array 102.

As illustrated in FIG. 3, in an example, controlling the light generation unit 100 by the light emitting control unit 200 to alternatively generate two light spot arrays 101 and 102 that are spaced from each other comprises:

transmitting the light emitted from the light emitting elements of the light generation unit 400 by using a plurality of optical fibers 140;

controlling the optical fibers 140 to be turn on/off by a light adjusting unit 150 so as to alternatively form the first and second light spot arrays 101 and 102.

Since the displaying method of the present embodiment may control the light generation unit by the light emitting control unit to alternatively generate at least two light spot arrays opposite to each other, the displaying method can realize the displaying of 3D image.

What is described above is related to the illustrative embodiments of the invention only and not limitative to the scope of the invention; the scopes of the invention are defined by the accompanying claims.

This application is based on and claims priority to Chinese Patent Application No. 201410374522.8, filed on Jul. 31, 2014, and the disclosure of which is incorporated by reference herein in its entirety.

What is claimed is:

1. A backlight module comprising a light generation unit and a light emitting control unit,
   wherein the light generation unit is configured to generate at least two light spot arrays that are spaced from each other, each light spot array comprises a plurality of light spots, and projections of the respective light spots onto a plane that is perpendicular to a light emitting direction of the light generation unit are staggered from each other;
   the light emitting control unit is configured to control the light generation unit to alternatively generate the at least two light spot arrays;
   the light generation unit comprises a plurality of light emitting elements that configured to emit light;
   the backlight module further comprises: a plurality of optical fibers configured to transmit light emitted from the light emitting elements; and light adjusting units configured to control the optical fibers to be turn on/off, so that the first and second light spot arrays are generated in turn.

2. The backlight module according to claim 1, wherein the light generation unit comprises a first light emitting array and a second light emitting array spaced from each other, each of the first and second light emitting arrays comprises a plurality of light emitting elements, and projections of the respective light emitting elements onto a plane that is perpendicular to the light emitting direction of the light generation unit are staggered from each other.

3. The backlight module according to claim 2, wherein the light emitting control unit is configured to control the first light emitting array to generate a first light spot array, and to control the second light emitting array to generate a second light spot array.

4. The backlight module according to claim 2, wherein the light emitting elements are organic light emitting diodes or laser diodes.

5. A display device comprising the backlight module according to claim 1.

6. The display device according to claim 5, further comprising a pixel unit disposed at a light exiting side of the backlight module.

7. The display device according to claim 6, wherein each light spot corresponds to one sub-pixel in the pixel unit.

8. The display device according to claim 6, further comprising a polymer dispersed liquid crystal (PDLC) optical switch unit which is interposed between the backlight module and the pixel unit and is configured to diffuse the light emitted from the backlight module.

9. A displaying method of the backlight module according to claim 1, comprising:
   controlling the light generation unit by the light emitting control unit to alternatively generate the at least two light spot arrays that are spaced from each other, each light spot array comprising a plurality of light spots, and the projections of respective light spots onto a plane that is perpendicular to a light emitting direction of the light generation unit being staggered from each other;
   wherein controlling the light generation unit by the light emitting control unit to alternatively generate the at least two light spot arrays that are spaced from each other, comprising:
   transmitting the light emitted from the light emitting elements of the light generation unit by using a plurality of optical fibers; and
   controlling the optical fibers to be turn on/off by a light adjusting unit so as to alternatively form the first and second light spot arrays.

10. The displaying method of the backlight module according to claim 9, wherein controlling the light generation unit by the light emitting control unit to alternatively generate the at least two light spot arrays that are spaced from each other, comprising:
    controlling a part of light emitting elements in the light generation unit to emit light by the light emitting control unit so as to form a first light spot array, and controlling the other of the light emitting elements to emit light by the light emitting control unit so as to form a second light spot array.

11. The display device according to claim 5, wherein the light generation unit comprises a first light emitting array and a second light emitting array spaced from each other, each of the first and second light emitting arrays comprises a plurality of light emitting elements, and projections of the respective light emitting elements onto a plane that is perpendicular to the light emitting direction of the light generation unit are staggered from each other.

12. The display device according to claim 11, wherein the light emitting control unit is configured to control the first light emitting array to generate a first light spot array, and to control the second light emitting array to generate a second light spot array.

13. The display device according to claim 5, wherein the light emitting elements are organic light emitting diodes or laser diodes.

* * * * *